United States Patent [19]

Givan et al.

[11] 4,295,069

[45] Oct. 13, 1981

[54] ARMATURE SHAFT FOR A VEHICLE STARTER MOTOR

[75] Inventors: David E. Givan, Anderson; Charles R. Ashton, Middletown, both of Ind.

[73] Assignee: General Motors Corporation, Detroit, Mich.

[21] Appl. No.: 897,109

[22] Filed: Apr. 17, 1978

[51] Int. Cl.² .............................................. H02K 7/00
[52] U.S. Cl. ............................ 310/67 R; 123/179 M; 310/261; 310/265; 310/83
[58] Field of Search ...................... 310/66, 67 R, 75 R, 310/75 D, 80, 83, 261, 262, 264, 265; 123/179 M

[56] References Cited

U.S. PATENT DOCUMENTS

| | | | |
|---|---|---|---|
| 3,210,554 | 10/1965 | Seilly et al. | 123/179 M |
| 3,444,405 | 5/1969 | Ellis | 310/156 |
| 3,996,486 | 12/1976 | Madsen | 310/265 X |

FOREIGN PATENT DOCUMENTS

| | | | |
|---|---|---|---|
| 682840 | 3/1964 | Canada | 310/261 |
| 2233838 | 1/1974 | Fed. Rep. of Germany | 123/179 M |
| 2339195 | 2/1975 | Fed. Rep. of Germany | 123/179 M |

Primary Examiner—Mark O. Budd
Attorney, Agent, or Firm—Robert M. Sigler

[57] ABSTRACT

A two piece armature shaft for a vehicle starter motor comprises a hollow tubular member with an open end and a portion being adapted to receive armature core laminations, said portion possibly being of greater diameter than the open end. The armature shaft further comprises a solid cylindrical member provided with spiral spline grooves for engagement with the normal clutch and pinion drive assembly, the solid cylindrical member being received coaxially in the open end of the tubular member with portions of the open end being staked into the spline grooves to combine the members into one shaft, the portions of the open end not so staked providing an axial stop for the clutch and pinion drive assembly.

3 Claims, 4 Drawing Figures

ARMATURE SHAFT FOR A VEHICLE STARTER MOTOR

BACKGROUND OF THE INVENTION

This invention relates to electric starter motor assemblies of the type well known and widely used in conjunction with motor vehicle engines, and particularly to a new and advantageous armature shaft for use in said assemblies.

The fuel efficiency of motor vehicles has become a matter of increasing concern; and it is well known that a decrease in the weight of a vehicle tends to increase the fuel efficiency of that vehicle. Even small savings in weight contribute to the overall effect when summed over many components of the vehicle, including the starter motor.

SUMMARY OF THE INVENTION

The armature shaft of this invention is characterized by lighter weight than conventional starter motor armature shafts and further enables, in some embodiments, a further weight and material saving in the armature core laminations which are carried on the shaft. The shaft comprises two portions, one of which is hollow and tubular to save weight and includes a portion which may be increased in diameter for further weight saving in the use of radially narrower armature core laminations and for material saving if said laminations are manufactured from powdered metal, through the elimination of scrap.

The other member of the armature shaft of this invention comprises a solid shaft which is hardened to receive the axially sliding clutch and pinion drive assembly of such electric starter motors and which is provided with the standard spiral spline grooves adapted to turn the pinion drive as it is axially moved into engagement with the vehicle engine flywheel. The solid member is received in an open end of the tubular member, portions of which open end are staked into the spline grooves to combine the members into one armature shaft, the portions of the open end of the tubular member which are not staked serving as an axial stop for the clutch and pinion drive assembly.

Thus the armature shaft of this invention combines the weight saving possibilities of a tubular shaft with the required hardened surface of the solid shaft and utilizes the spiral spline grooves for joining the two members together into one shaft. Further details and advantages of this invention will be apparent from the accompanying drawings and following description of a preferred embodiment.

DESCRIPTION OF THE PREFERRED EMBODIMENT

Figure 1:
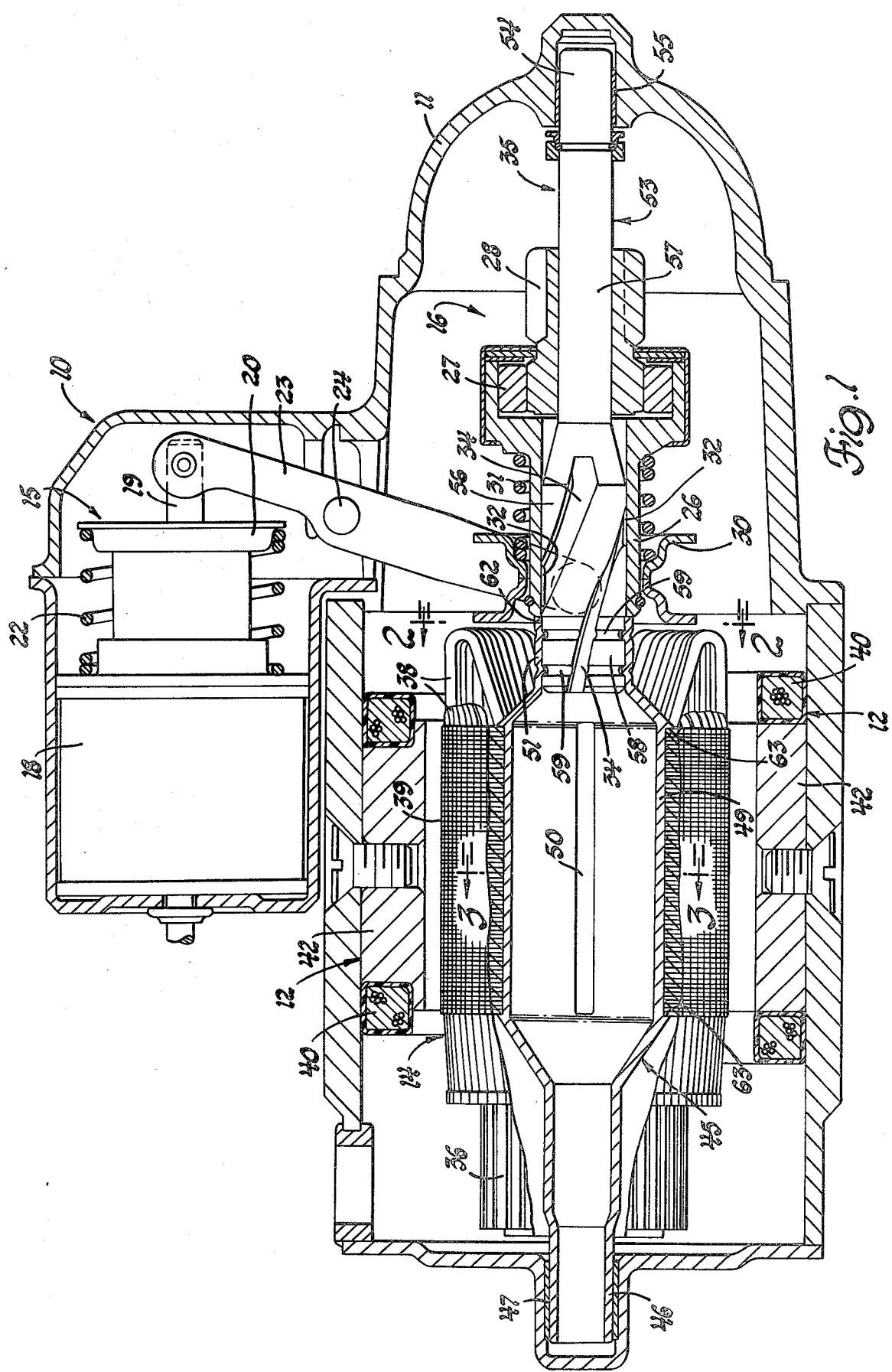
FIG. 1 is substantially a cross section through the axis of a starter motor including an armature shaft according to this invention.
Figure 2:
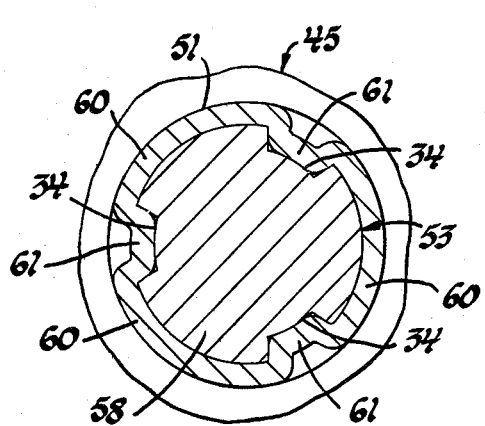
FIG. 2 shows a partial section view along lines 2—2 in FIG. 1.

Referring to FIG. 1, a starter motor 10 has a case 11 which encloses field coil assemblies 12, an armature 14, solenoid assembly 15, and clutch and pinion drive assembly 16. These members and assemblies are supported and interconnected within case 11 in the standard manner well known to those skilled in the art.

In greater detail, the solenoid assembly 15 comprises a solenoid coil 18 which, when actuated, draws an armature shaft 19 with a collar 20 to the left in FIG. 1 against a return spring 22. One end of a shift lever 23, pivoted at pivot 24, moves with armature shaft 19.

Clutch and pinion drive assembly 16 comprises an axially slidable sleeve 26, an overrunning clutch 27, a pinion gear 28 and a shift collar 30, shift collar 30 is moved to the right in FIG. 1 by movement of the shift lever 23 in response to actuation of the solenoid apparatus 15. Movement of shift collar 30 applies force through a spring 31 to sleeve 26 to move it and pinion gear 28 to the right into engagement with the flywheel, not shown, of the vehicle engine. A rotational motion is imparted to sleeve 26 and pinion gear 28 during their axial movement by internal splines 32 of sleeve 26 cooperating with spiral spline grooves 34 in armature shaft 35, along which sleeve 26 slides. This rotation helps pinion gear 28 engage with the teeth of the flywheel.

While power is supplied to solenoid coil 18 to cause engagement of pinion gear 28 with the engine flywheel, it is also supplied to the field coils 12 and, through brush apparatus, not shown, and a commutator 36 on armature shaft 35, to armature windings 38. The armature windings 38 are wound on a core comprising a plurality of armature core laminations 39, which are, in turn, fixed to armature shaft 35. The field coils 40 of field coil assemblies 12 are wound on field core members 42 fixed to case 11. Thus, as the pinion gear 28 is engaged with the flywheel, the armature 14 will be caused to turn within case 11 and thus, through the flywheel, turn the engine crankshaft.

Figure 3:
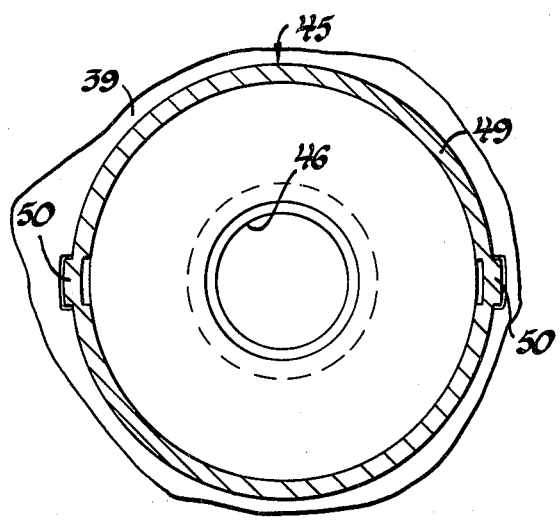
FIG. 3 shows a partial section view along lines 3—3 in FIG. 1.
Figure 4:
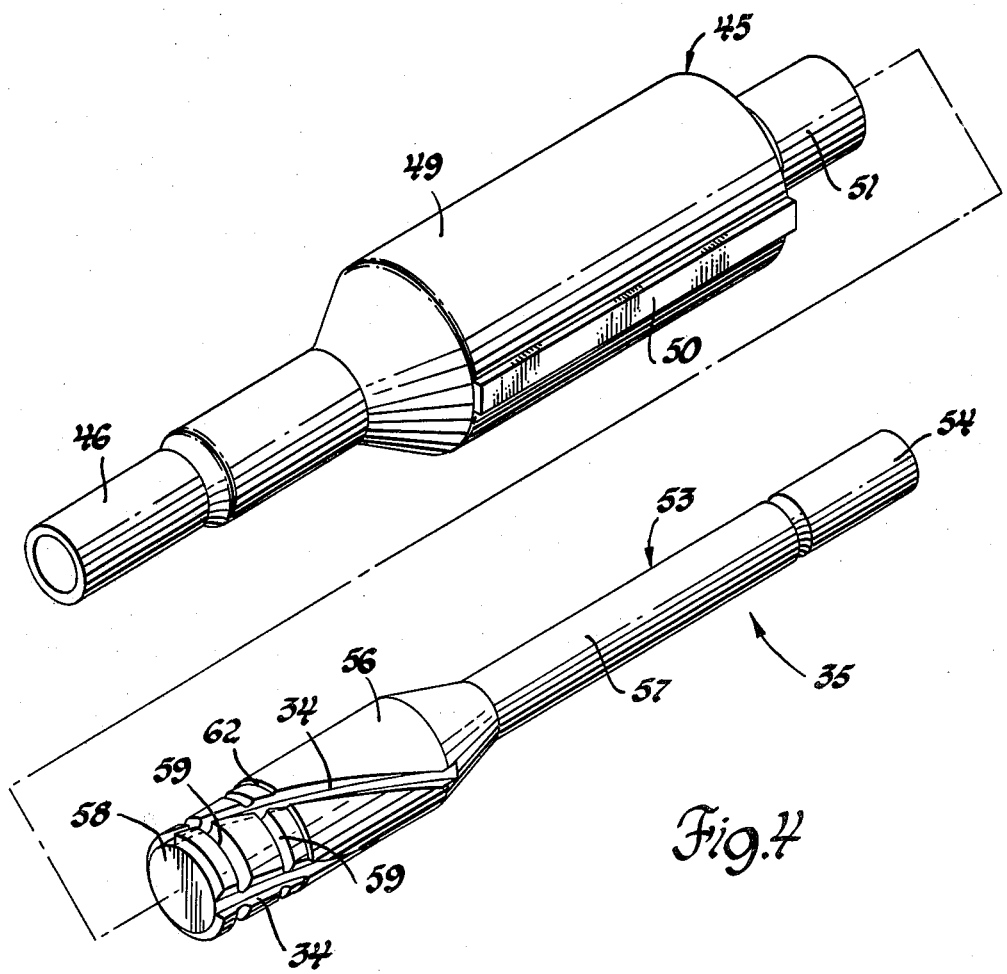
FIG. 4 shows an exploded perspective view of the armature shaft of FIG. 1.

Armature shaft 35 includes a tubular member 45, one end 46 of which is of comparatively small diameter and rotatably received in a bearing 47 in case 11. A central portion 49 of tubular member 45 is greatly enlarged in diameter, in this embodiment, compared with end 46 and may have one or more longitudinally extending raised ridges 50, as seen in FIGS. 1, 3 and 4. The other end 51 of tubular member 45 is reduced in diameter from that of central portion 49 and is open, as seen in FIG. 1.

A solid cylindrical member 53 comprises the remainder of armature shaft 53 and has an end 54 received in a bearing 55 in case 11 as seen in FIG. 1. Solid member 53 further has a pinion portion 57, upon which pinion gear 28 is rotatably received, a sleeve portion 56, upon which sleeve 26 is rotatably received and another end 58 which is of such diameter as to just fit in the open end 51 of tubular member 45. The other end 58 and sleeve portion 56 of solid member 53 are provided with the spiral spline grooves 34; and, if desired, the other end 58 can further be provided with one or more circumferential grooves 59.

The spiral spline grooves 34 of solid member 53 provide, at the end 58 of said member, depressions into which several portions 61 of the open end 51 of tubular member 45 can be staked to join the two members into one armature shaft. Portions 61 and grooves 34 provide at least circumferential rigidity and a degree of longitudinal rigidity to the shaft 35. If desired, the open end 51 of tubular member 45 can also be staked into circumferential grooves 59 for additional longitudinal rigidity.

Further, it can be seen in FIG. 1 that the remaining portions 60 of the end 51 of tubular member 45 that are not staked into grooves 34 serve as a stop for sleeve 26, thus eliminating the need for a special collar or ring that would otherwise provide such a stop. Finally, a slightly raised shoulder 62 may be provided, as seen in FIGS. 1 and 4, between end 58 and sleeve portion 56 as a stop for use in the insertion of member 53 into the open end 51 of tubular member 45 during manufacture of the shaft 35.

As previously mentioned, tubular member 45, on its central portion 49 carries a plurality of armature core laminations 39 on which are wound the armature windings 38. Laminations 39 are held tightly between coined collars 63 on central portion 49 and are prevented from rotating with respect to tubular member 45 by ridges 50. The normal armature shaft does not have the enlarged diameter of the central portion 49 of tubular member 45; and thus the laminations for such a shaft must have an inner diameter significantly smaller than the inner diameter of laminations 39. The additional material which is close to the inner diameter of the laminations, however, contributes very little to the total flux obtained with the armature windings 38. Thus the point at which the enlargement of the inner diameter of laminations 39 begins to decrease flux by an appreciable amount can be determined and the diameter fixed at that point with no appreciable loss of flux and, therefore, of torque output. The use of the larger diameter results in a saving of weight in the core laminations 39; and, if laminations 39 are manufactured from powdered metal with the resultant practically negligent amount of scrap, material savings are also realized.

Thus the armature shaft of this invention reduces weight through the use of a tubular member which may have a portion of enlarged diameter for additional weight savings in the armature core laminations and provides a unique joint between the tubular and solid portions thereof which utilizes the existing spiral spline grooves of the solid member, into which portions of the tubular member can be staked, the joint further providing the additional benefit of an axial return stop in the end of the tubular member for the sleeve of the clutch and pinion drive assembly. The specific embodiment shown and described above is only one of many that will occur to those skilled in the art; and this invention should therefore be limited only by the claims which follow.

The embodiments of the invention in which an exclusive property or privilege is claimed are defined as follows:

1. An armature shaft for a motor vehicle engine starter motor assembly of the type having an axially movable clutch and pinion drive assembly splined to the armature shaft for rotation therewith, the armature shaft comprising, in combination:
    a tubular member having an open end and another end and being adapted to receive armature core laminations thereon; and
    a solid cylindrical member having one end provided with at least one spiral spline groove adapted for engagement with the clutch and pinion drive assembly and another end, the other ends of the tubular and solid cylindrical members comprising the opposite ends of the armature shaft, the one end of the cylindrical member being received coaxially in the open end of the tubular member, the open end of the tubular member having at least one portion thereof radially staked into the spline groove, whereby the tubular and cylindrical members are joined to each other, the portions of the open end of the tubular member which are not radially staked into the spline groove being effective to provide an axial stop for the clutch and pinion drive assembly.

2. An armature shaft for a motor vehicle engine starter motor assembly of the type having an axially movable clutch and pinion drive assembly splined to the armature shaft for rotation therewith, the armature shaft comprising, in combination:
    a tubular member having an open end and another end and being adapted to receive armature core laminations thereon; and
    a solid cylindrical member having one end provided with a plurality of spiral spline grooves adapted for engagement with the clutch and pinion drive assembly and further with a circumferential groove, the one end of the cylindrical member being received coaxially in the open end of the tubular member and another end, the other ends of the tubular and solid cylindrical members comprising the opposite ends of said armature shaft, the open end of the tubular member having one or more portions thereof radially staked into the circumferential groove and spline grooves, whereby the tubular and cylindrical members are fixed axially and circumferentially with respect to each other, the open end of the tubular member further having one or more portions not staked into said grooves, whereby said last portions provide an axial stop for the clutch and pinion drive assembly.

3. An armature shaft for a motor vehicle engine starter motor assembly of the type having an axially movable clutch and pinion drive assembly splined to the armature shaft for rotation therewith, the armature shaft comprising, in combination:
    a tubular member having an open end, another end, and a central portion of diameter greater than that of the open end, the central portion being adapted to receive thereon armature core laminations having an inner diameter greater than that of the open end of the tubular member, whereby weight and material savings may be realized in said armature core laminations; and
    a solid cylindrical member having one end provided with a plurality of spiral spline grooves adapted for engagement with the clutch and pinion drive assembly and further with a circumferential groove, the solid cylindrical member further having another end, the other ends of the tubular and solid cylindrical members comprising the opposite ends of said armature shaft, the one end of the cylindrical member being received coaxially in the open end of the tubular member and ending short of the central portion thereof, the open end of the tubular member having one or more portions thereof radially staked into the circumferential groove and spline grooves, whereby the tubular and cylindrical members are joined to one another against axial and circumferential relative motion, the open end of the tubular member further having one or more portions not staked into said grooves, whereby an axial stop is provided for the clutch and pinion drive assembly.

* * * * *